FIP8102 XR 3,066,195

Nov. 27, 1962 M. A. STERN ET AL 3,066,195

SIGNAL TRANSMITTING AND RECEIVING STATION

Filed Sept. 15, 1958 6 Sheets-Sheet 1

INVENTORS.
WILLIAM M. WOODHULL
MARVIN A. STERN
BY [signature]
AGENT

Nov. 27, 1962 M. A. STERN ET AL 3,066,195

SIGNAL TRANSMITTING AND RECEIVING STATION

Filed Sept. 15, 1958 6 Sheets-Sheet 2

INVENTORS.
WILLIAM M. WOODHULL
MARVIN A. STERN
BY
AGENT

Nov. 27, 1962 M. A. STERN ET AL 3,066,195

SIGNAL TRANSMITTING AND RECEIVING STATION

Filed Sept. 15, 1958 6 Sheets-Sheet 3

INVENTORS.
WILLIAM M. WOODHULL
MARVIN A. STERN
BY [signature]
AGENT

SIGNAL TRANSMITTING AND RECEIVING STATION

Filed Sept. 15, 1958 6 Sheets-Sheet 4

INVENTORS.
WILLIAM M. WOODHULL
MARVIN A. STERN
BY
AGENT

INVENTORS.
WILLIAM M. WOODHULL
MARVIN A. STERN
BY [signature]
AGENT

INVENTORS.
WILLIAM M. WOODHULL
MARVIN A. STERN
BY
AGENT 3,066,195
Patented Nov. 27, 1962

3,066,195
SIGNAL TRANSMITTING AND RECEIVING STATION

Marvin A. Stern and William M. Woodhull, Rochester, N.Y., assignors to General Dynamics Corporation, Rochester, N.Y., a corporation of Delaware Filed Sept. 15, 1958, Ser. No. 761,045
12 Claims. (Cl. 179—84)

Our invention relates to apparatus for transmitting and receiving electrical signals over a communication medium and, more particularly, to a station or subset to be connected to a telephone line for transmitting audio frequency signals to and from the line.

In the telephone art, electronic type switching equipment has been developed to replace the electromechanical central office switching apparatus presently used for establishing connections between calling and called lines terminated at the central office. In the past, the tendency has been to regard such electronic type switching equipment as being separate and distinct from the line equipment including lines, central office terminations, and stations. As a result, the practice has been to continue to use line equipment in the state in which it was developed for use with electromechanical switching equipment.

Accordingly, station subsets suited for use in presently developed electronic switching systems may include carbon button type microphones and apparatus for transmitting direct current directive and supervisory signals to the central office; further, electrical apparatus at the station is designed to be powered solely by energy supplied over the line conductors from the central office.

The transmission and signaling efficiencies of such subsets are approaching their maximum possible values because the design of such subsets has already been carefully evaluated. Taken on an absolute basis, however, certain of the components are signaling concepts in such subsets are relatively inefficient. For instance, the ratio of speech signal power output of the carbon button microphone to the direct current power input is relatively low compared to the ratio of the same quantities in the case of a dynamic type microphone driving a simple transistor amplifier. Similarly, the direct current signaling system employed in systems using conventional subsets functions on a full-time basis, and is useful for transmitting only a limited possible number of signals (such as wet-dry, high-low, duplex, etc.) in the cases where a two-wire telephone line is used to connect the station to the central office. In contrast to this, an audio frequency directive and supervisory signaling system may be made to work on a part-time basis, and the number of distinct and separate signals which may be sent over the line is limited only by the number of separate signaling frequencies possible within the transmission spectrum of the line. While systems using single or compound audio frequency signals are presently used in toll switching equipment, such systems have never been employed in subscriber station subsets.

Therefore, it is an object of our invention to provide a new and improved station for transmitting signals to and receiving signals from a communication medium or line.

Another object of our invention is to provide telephone station employing new and improved signaling apparatus.

Another object of our invention is to provide a telephone subset adapted to transmit and receive voice frequency directive and supervisory signals.

Another object of our invention is to provide a new and improved voice frequency signaling subset in which the number of operations to be carried out by the user is no greater than the number of operations presently carried out by users of conventional, electromechanical type telephone subsets.

Another object of our invention is to provide a new and improved telephone subset in which certain signaling functions are carried out automatically.

Another object of our invention is to provide a telephone subset which, upon the removal of the handset, transmits a signal to the line until an acknowledgment signal is received from the line.

Another object of our invention is to provide a new and improved telephone subset in which signaling apparatus continues to function for a predetermined time interval following the hang-up operation.

Another object of our invention is to provide a new and improved subset in which a single transmitting amplifier is used for coupling both the subset microphone and the signaling oscillators to the line.

We accomplish these and other objects by providing in a station or subset for applying signals to a communication medium such as a telephone line, first signal generating or transmitting means for applying directive and supervisory signals to the line. The first signal transmitting means includes a pair of oscillators coupled to the line through a voice frequency amplifier. Means including manually operable keys is provided for selectively operating (tuning) the signal transmitting means at the will of the user. An instrument, such as a telephone handset, and means including a cradle and its attendant hookswitch mechanism is provided for receiving the handset. The cradle and hookswitch mechanism may be of the general type shown and described in the copending patent application of Joseph Attridge, Jr., Serial No. 691,241 filed October 21, 1957 and assigned to the same assignee as the present invention. The hookswitch mechanism includes contact sets effective in response to the removal and return of the handset from and to the cradle for selectively operating the signal transmitter in order to cause supervisory seize and release signals to be transmitted to the line automatically upon the removal and return of the instrument to its receiving means, while the same signal transmitter may be used in the above-described manner upon the manual operation of the tuning keys.

The subset also includes switching means comprising a flip-flop of the well-known type for controlling the connection of a power source to the power input of the first signal generating means. The flip-flop means is effective upon the operation of the hookswitch mechanism caused by the removal of the instrument from its cradle for connecting the power source to the oscillator power input. The input of the flip-flop means is coupled to the line. The flip-flop means responds to the application of an acknowledgment signal from the line to the input by decoupling the power source from the oscillator input. With this arrangement, a supervisory signal is sent from the subset to the line until an acknowledgment signal is received at the station.

As indicated above, the power source is used for energizing certain of the power consuming devices in the subset including the aforementioned first signal transmitter. A switch operative between first and second conditions is effective for opening and closing, respectively, a connection between the power source and the certain devices in order to make those devices operable upon the removal of the instrument from its cradle. The aforementioned hookswitch mechanism is further arranged so that certain ones of its contacts are operative in response to the placement of the instrument on the receiving means and to the removal of the instrument from the receiving means for operating the switch to its first and second conditions, respectively. In order to insure that the power consuming devices are maintained operative following the return of the handset to the cradle, means is also provided for maintaining a switch in its second condition for a predetermined time interval following the operation of the contact set resulting from the placement of the instrument on the subset cradle.

In addition to the aforementioned first signal source, the subset also includes a microphone for generating audio frequency speech signals. The microphone is coupled through a preamplifier to the input of the aforementioned voice frequency amplifier in parallel with the first and second oscillators.

These and other features of our invention will become more apparent from a consideration of the following description read in connection with the accompanying drawings in which.

Figure 1:
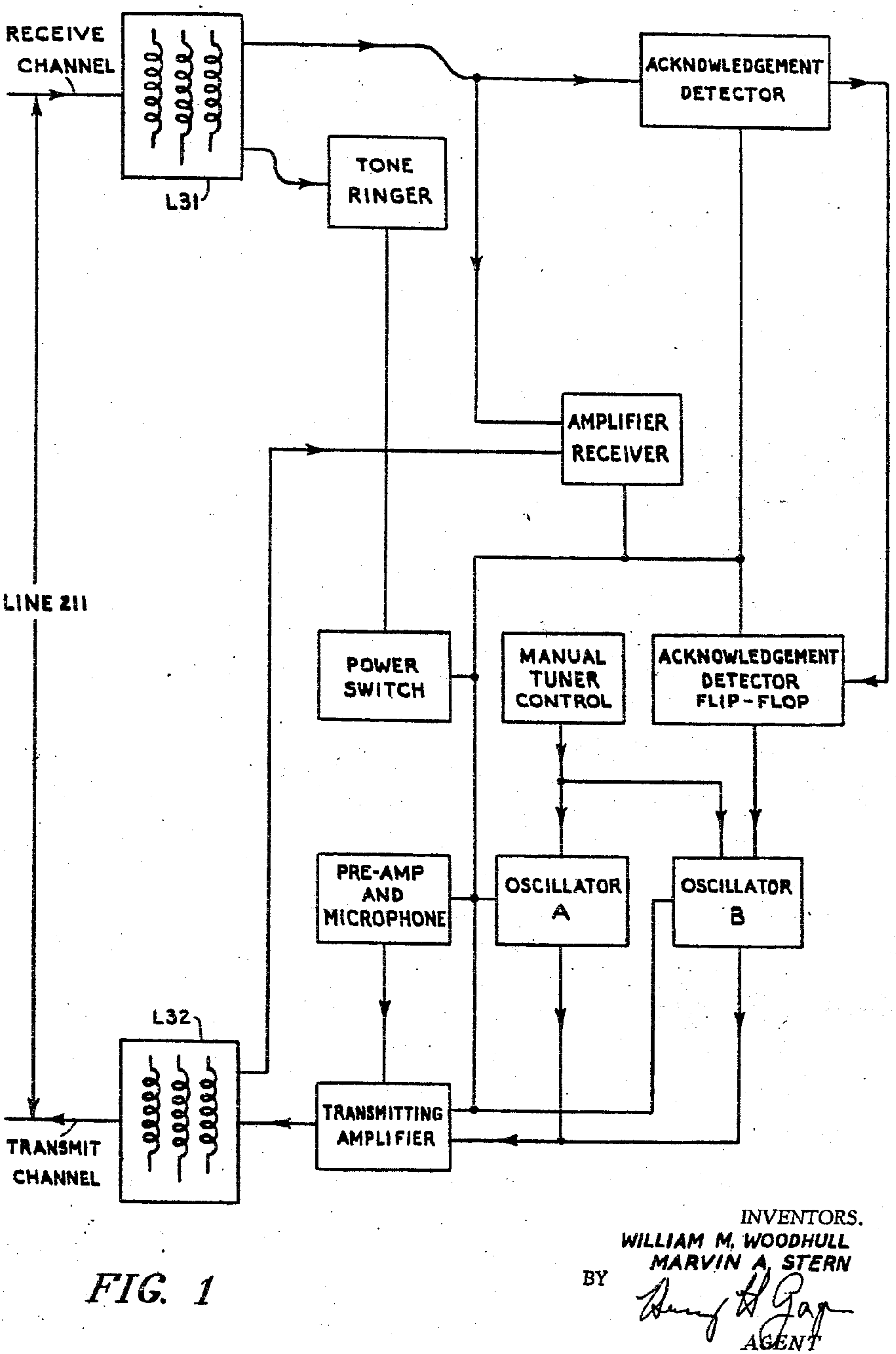
FIG. 1 shows a block diagram of the station telephone.

Power for the apparatus set forth in the following paragraphs is supplied from a source such as a pair of batteries located at the subset. The most negative terminal of the first battery and the most positive terminal of the second are grounded to the subset chassis. This point is referred to in the following paragraphs as "ground" and in the drawings by a conventional ground symbol. The most positive terminal of the first battery and the most negative terminal of the second battery are hereinafter referred to in the written description as "+1.5 volt source" and "−6 volt source," respectively, and in the drawings as "+1.5 v." and "−6 v.," respectively.

The transistors used in the circuits described in the following paragraphs are of the well-known PNP junction type. This transistor type was chosen in order to meet the exigencies of circuit design. It is to be understood that a different type, such as NPN, could be substituted, and the circuit modified correspondingly without changing the scope or nature of our invention.

GENERAL DESCRIPTION OF THE TELEPHONE OFFICE

Referring to the drawings, the system with which the station forming the preferred embodiment of our invention is adapted to work includes a central office 130 having switching equipment of the so-called electronic type. The office may be similar to the one disclosed in Patent No. 2,968,697 of Donald M. Rager, Jr., and assigned to the same assignee as the present invention. Because the apparatus used for effecting a switching operation within central office 130 does not form a part of the present invention, its operation is not described except in general terms in the succeeding paragraphs.

Figure 2:
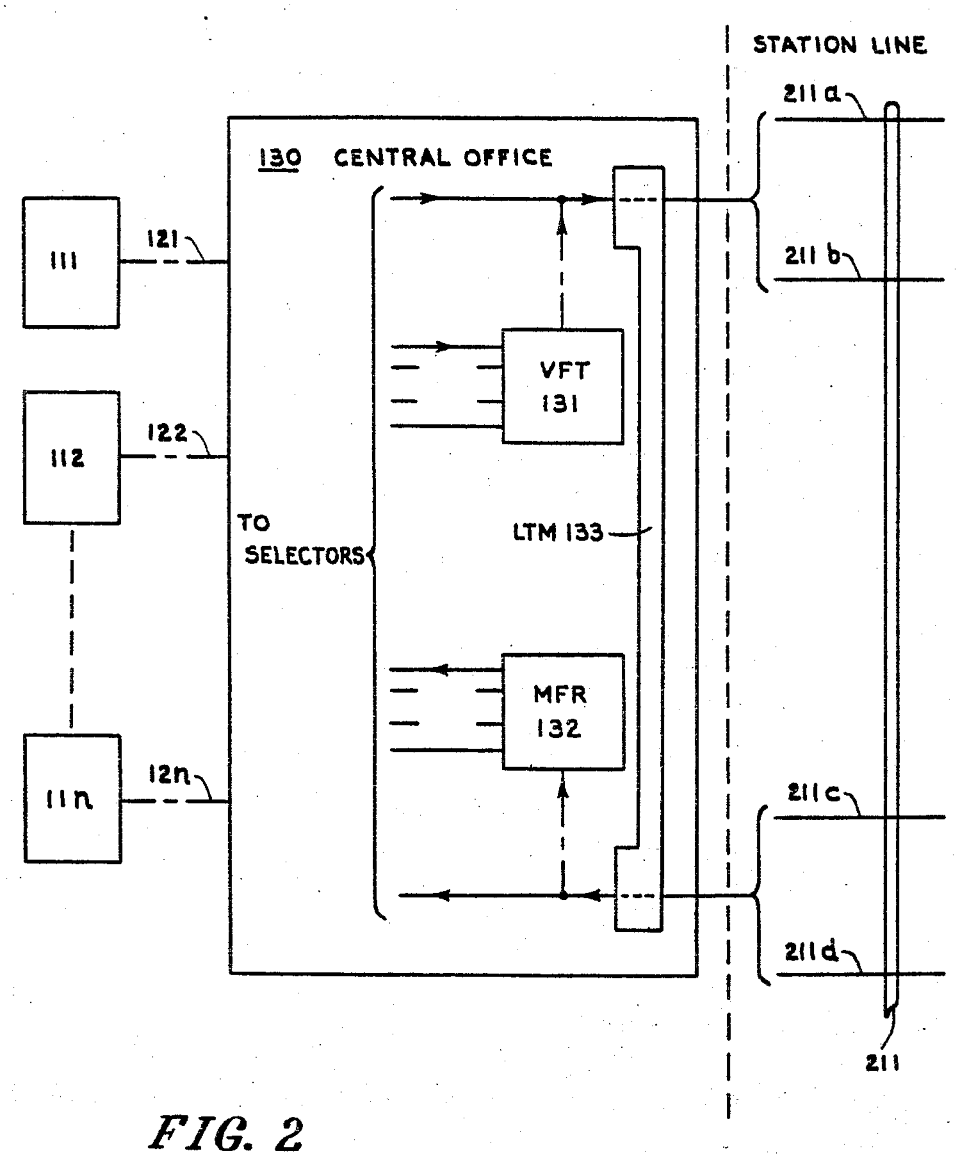
FIG. 2 shows a telephone office including central office switching equipment in block diagram form and certain lines.
Figure 3:
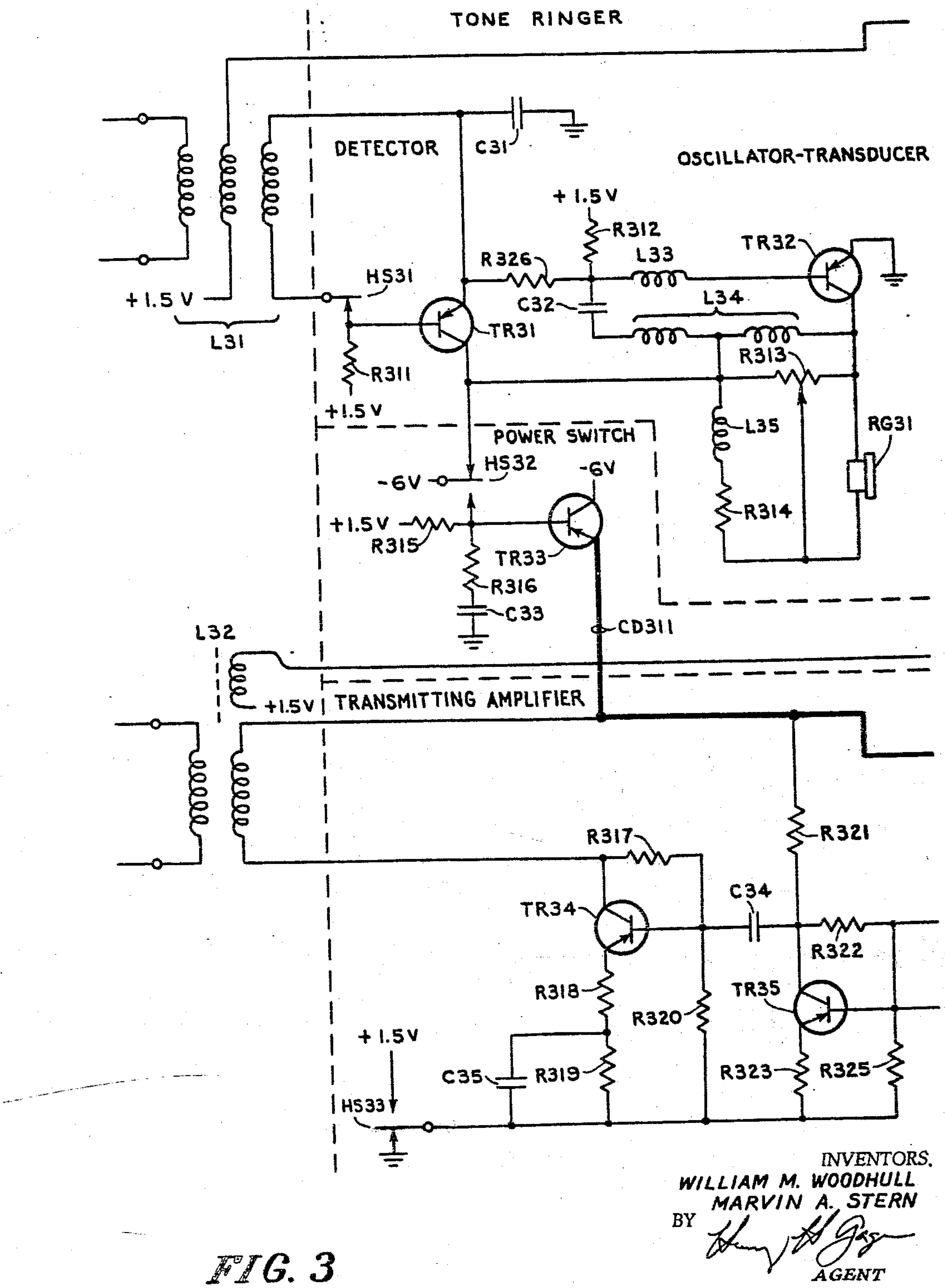
FIGS. 3–5 show a schematic diagram of the station telephone.
Figure 4:
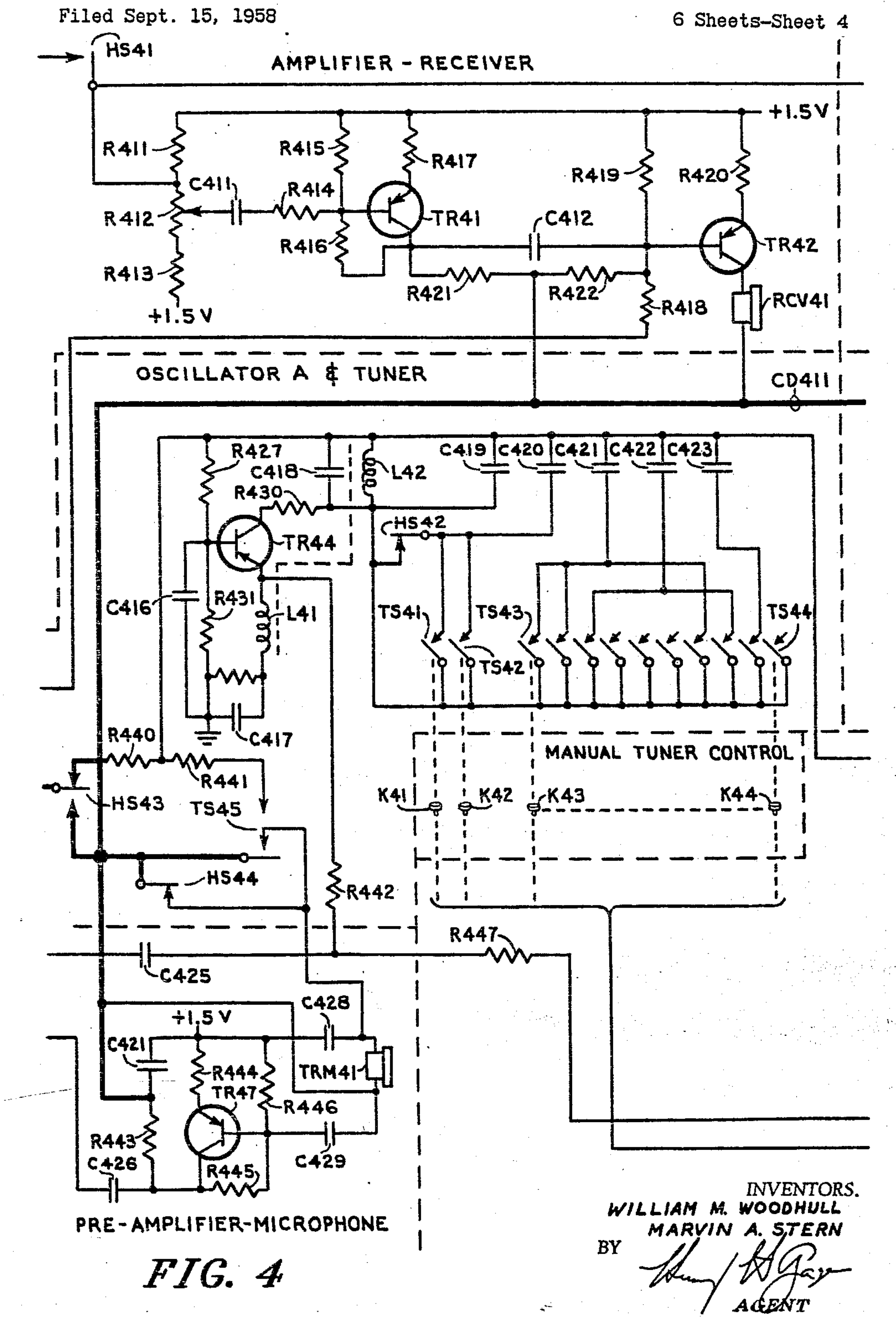
Figure 5:
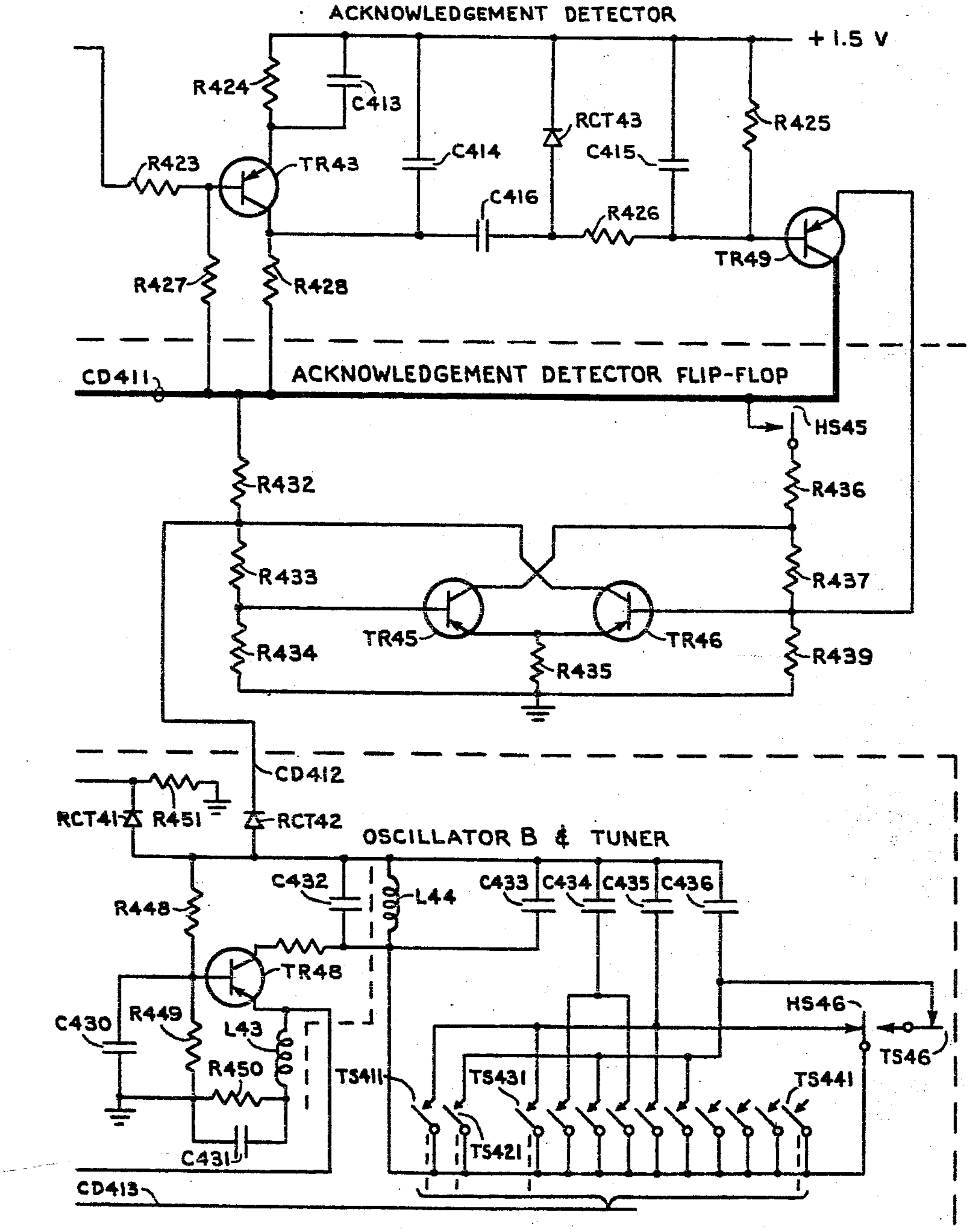

The telephone switching system contemplated includes a plurality of lines such as 121, 122, and **12*n* to which stations 111, 112, and 11*n*, respectively, are connected, as well as line 211 shown in FIG. 1 and to which the station in FIGS. 3–5 is connected. All lines are terminated at central office 130. Each line, such as 211, is a communication medium or link and comprises a first channel including conductors such as 211*a* and 211*b* and an electrically separate second channel including conductors such as 211*c* and 211*d* for receiving signals at the station and for transmitting signals from the station to office 130, respectively. The channel including conductors 211*a* and 211*b* is hereinafter referred to as the receive channel, while the channel including conductors 211*c* and 211*d* is hereinafter referred to as the transmit channel. Line 211 is terminated at central office 130 on line termination LTM133; the other lines ending at central office 130** are similarly terminated, although such terminations are not shown in FIG. 2.

It is to be understood that our invention is not limited to telephone stations, in which the useful signals put out to the communication medium are speech signals. Similarly, it is to be understood that the communication medium with which our invention can be made to function is not limited to a line, nor to a medium having electrically distinct transmit and receive channels. For instance, the medium could be a radio frequency link, and the signal receiving and transmitting sections of the station could be interconnected to a single, two-way medium by the use of a hybrid coil in the manner well understood by those skilled in the telephone art.

Each line such as 211 is terminated at office 130 and is further arranged so that speech and supervisory signals incoming from the transmit line channel to the office are coupled to selectors (not shown) within the office and to the input side of a multifrequency receiver such as MFR132, respectively, within the office. The receive channel of the line is coupled to the speech channel of the aforementioned selector and to the output side of a voice frequency transmitter such as VFT131 in order to transmit speech as well as ringing and supervisory signals, respectively, over the receive channel to the station. Voice frequency transmitter VFT131 is selectively energized under the control of the selector in a manner to be set forth presently.

GENERAL DESCRIPTION OF THE STATION

In the following description, the operation of the mechanical apparatus of the subset is described in general terms only, because the details of such mechanical apparatus is not a part of the present invention. The subset includes a telephone instrument or handset comprising a receiver RCV41 physically linked to a transmitter TRM41 shown in FIG. 4. The subset also has a cradle for receiving the instrument when the instrument is not in use.

The cradle also includes means cooperating with the handset for actuating a hookswitch mechanism comprising sets of electrical contacts. Each contact set is operable under control of the actuating means to a first (normal) condiiton when the instrument is placed on the cradle and to a second (operated) condition when the instrument is removed from the cradle. The hookswitch mechanism which includes a plurality of sets of contacts in normal and operated conditions is effective for opening and closing particular ones of the contact sets in the manner to be described in succeeding paragraphs. In the drawings, only the contact sets of the hookswitch mechanism are shown. These contact sets are shown in detached form and are represented in the position assumed when the hookswitch mechanism is in its normal condition. Normally closed contact sets, such as HS31, are hereinafter referred to as "break," while normally open contact sets, such as HS41, are hereinafter referred to as "make."

Further, the hookswitch mechanism is adjusted so that certain contact sets including HS31, HS32, HS43, and HS46 operate before other contact sets including HS33, HS41, HS42, HS44, and HS45 as the mechanism is changed from normal to operated condition. These groups of contacts sets are operated in reverse sequence when the mechanism is changed from operated to normal condition. The reason for sequential operation of the contact sets is explained in paragraphs which follow.

For convenience, the equipment and devices at the station are next described in terms of their function. Referring to FIG. 1, the station or subset includes various power consuming devices used for generating and translating electrical signals, as well as the aforementioned power source. In the case of incoming calls, one of these devices, the tone ringer, which is used to indicate the presence of incoming calls over line 211, is maintained ready for service by virtue of the fact that power is supplied to the tone ringer power input by the hookswitch mechanism when the latter is in normal condition and the fact that the hookswitch mechanism is also normally effective for coupling the receive channel of line 211 to the signal input of the tone ringer through the windings of transformer L31. The tone ringer is actuated in response to the incoming signal, of, for instance, 400 cycles per second, and produces an audible signal to inform the user that a call incoming to the subset is waiting on the line. The user of the station responds to the audible signal by removing the handset from its cradle and consequently changing the hookswitch mechanism from normal to operated condition. The hookswitch mechanism in operated condition is effective for decoupling the receive channel of line 211 from the tone ringer signal input and for disconnecting the power source from the tone ringer power input in order to prevent further operation of the tone ringer after an incoming call has been answered.

The hookswitch mechanism in operated condition is further effective for operating a power switch from its normal to operated condition. The power switch in operated condition is effective in response to the operation of the hookswitch mechanism for connecting the power source to other of the power consuming devices within the station such as the acknowledgment detector, amplifier-receiver, preamplifier and microphone, and the transmitting amplifier. The uses of these devices are to be described presently. The hookswitch mechanism in operated condition is also effective for coupling the receive channel of line 211 to the signal inputs of the acknowledgment detector and amplifier-receiver. The amplifier-receiver and acknowledgment detector are now ready for use.

The power switch in operated condition is further effective in response to the operation of the hookswitch mechanism for changing the acknowledgment detector flip-flop within the station from its normal condition to the first of two stable states. The flip-flop functions as a switch, and is effective in its first stable state in response to the operation of the power switch for connecting the power source to the input of oscillator B in order to make the latter generate a seize signal at this time. This seize signal, of, for instance, 1500 cycles per second, from the oscillator B output is coupled to the input of the transmitting amplifier, where it is amplified and applied to the transmit channel of line 211 through coupling transformer L32.

Upon receipt of the seize signal at the central office connected to the remote end of line 211, means within the office is effective for disconnecting the central office ringing tone source from the line and for sending a burst of dial tone (for instance, a signal of 600 cycles per second) to the station over the receive channel of line 211. This signal, applied to the input of the acknowledgment detector, is effective for thereupon operating the acknowledgment detector. The acknowledgment detector in operated condition is effective for transferring the acknowledgment detector flip-flop from first to second stable state. The flip-flop in second stable state effectively disconnects the power source from the oscillator B input, so that the oscillator stops producing the seize signal.

At this point, the substation is in condition to both transmit and receive speech signals to and from line 211. Speech signals put into the microphone are passed through the preamplifier and transmitting amplifier to the transmit channel of the line. Similarly, speech signals incoming to the substatin are amplified and applied to the signal transducer within the amplifier receiver.

In the case of an outgoing call, that is, one that originates at the substation, if it is assumed that line 211 is in idle condition, the call is originated by removing the handset from its cradle, thereby placing the hookswitch mechanism in operated condition. The hookswitch mechanism is effective for operating the power switch and for otherwise applying power to the various devices within the substation in the above described manner. As in the previous case, the acknowledgment detector flip-flop is thereby operated from its normal condition to its first stable state, so that the seize signal is transmitted from the station to the central office over the transmit channel of line 211. Similarly, receipt of the seize signal at the central office is effective for causing means at the central office to send dial tone back to the station over the receive channel of line 211. As a result, the acknowledgment detector at the station is operated and the acknowledgment detector flip-flop is operated from first to second stable state. The flip-flop again disconnects power from the oscillator B input so that the seize signal to the central office is interrupted. The equipment at the central office is arranged to stop transmitting dial tone signal when the seize signal is no longer received from the station. As in the case of incoming calls, the substation is now in condition to both transmit and receive speech signals from line 211 in the above mentioned manner throughout the duration of the call.

In order to transmit directive signals to the central office, appropriate ones of a plurality of manually controlled tuner control keys are operated by the user of the substation for tuning oscillators A and B so that the oscillators are capable of producing combinations of particular frequencies. Operation of any one of the manually controlled keys is also effective for operating a common contact set which in turn connects the power source to the oscillator A and B inputs. Thereupon signals in the form of predetermined combinations of frequencies are applied to the input of the transmitting amplifier for transmission to the central office. The common manual tuner control contact set is also effective in operated condition for suppressing the preamplifier and microphone in order to prevent spurious signals from being transmitted over line 211 during the directive signaling operation.

At the conclusion of either an incoming or outgoing call to or from the station, the handset is returned to the cradle, so that the hookswitch mechanism is returned from its operated to normal condition. Means made operative in response to the operation of the hookswitch mechanism is provided for maintaining the power switch in operated condition for a predetermined time interval following the restoration of the hookswitch mechanism to normal condition in order to allow the power source to continue to be connected to certain ones of the station devices for a limited time period with effects which are next described.

The hookswitch mechanism in normal condition is effective in response to the continued operation of the power switch for connecting the power source to the input of oscillator B and the power input of the transmitting amplifier. For this reason, oscillator B is operated at this time to provide a signal to the transmit channel of line 211 and the central office to dismiss the central office equipment. At the end of the predetermined time interval, the power switch returns to its normal condition, thereby disconnecting the power source from the inputs of the transmitting amplifier and oscillator B. The station is now in normal condition and is ready for further use.

RECEIVING A CALL AT THE STATION

*Ringing the station.*—The station includes a tone ringer comprising an input or detector stage and an oscillator-transducer. The detector includes transistor TR31, and the oscillator-transducer includes transistor TR32 and ringer RG31, the oscillator-transducer being coupled to the output of the detector. The tone ringer functions in the manner next set forth.

When the hookswitch mechanism is in normal condition and no voltage is induced in the right-hand winding of transformer L31, the tone ringer is maintained in standby condition. To this end, means comprising the break portions of contact set HS32 is effective for applying −6 volts to the collector of transistors TR31 and TR32. The bases of transistors TR31 and TR32 are connected to the +1.5 volt source through resistor R311 and through resistor R312 and inductance L33, respectively. The emitter of transistor TR31 is maintained at slightly less than +1.5 volts through its connection to the +1.5 volt source which is traced from resistor R311, break contact set HS31, and the right-hand winding of transistor L31. The left-hand plate of capacitor C31 is also maintained at +1.5 volts while the tone ringer is in standby condition. The emitter of transistor TR32 is directly grounded. Because the emitters of transistors TR31 and TR32 are negative with respect to their bases when the tone ringer is in standby condition, neither transistor TR31 nor TR32 conducts current between its emitter and collector in any substantial quantity.

When voice frequency transmiter VTF131 is operated to apply a 400 cycle per second ringing signal to the receive channel of line 211, a corresponding voltage induced in the right-hand winding of transformer L31 is applied to the input of the tone ringer detector, i.e., across the base and emitter of transistor TR31. When the voltage induced in transformer L31 at the upper end of the right-hand winding is positive with respect to the lower end of that winding, the emitter of transistor TR31 becomes positive with respect to the base, so that transistor TR31 is conductive between its emitter and collector. During such positive halves of the ringing signal, the emitter stands substantially at the voltage of the collector, i.e., −6 volts. During the times that the upper end of the right-hand winding of transformer L31 swings negative with respect to the lower end, the emitter of transistor TR31 goes negative with respect to its base, so that current flow between the emitter and collector of transistor TR31 is stopped. The intermittent flow of current in the emitter-collector circuit of transistor TR31 is effective to build up a charge on capacitor C31, so that the voltage on the left-hand plate of capacitor C31 is raised as the ringing current continues to be received from the line from its normal positive voltage to a value that approaches −6 volts.

Capacitor C31, negatively charged in the above-described manner, discharges through resistors R326 and R312 to the +1.5 volt source. Under these conditions, the voltage at the lower end of resistor R312 is changed from its normal +1.5 volts to approximately −1 volt. This negative voltage is applied to the input of the oscillator-transducer, i.e., between the base and emitter of transistor TR32. Making the base of transistor TR32 negative with respect to its emitter makes transistor TR32 conductive between its emitter and collector, and operable at this time to carry out its function in the oscillator-transducer section of the tone ringer.

The flow of current through the emitter-collector of transistor TR32 and the right-hand winding of coil L34 is effective for inducing a voltage in the left-hand winding of coil L34. The latter winding is coupled to the base of transistor TR32 through capacitor C32 in such a manner that voltage fed back to the base of transistor TR32 maintains the base of transistor TR32 negative with respect to its emitter so long as the aforementioned current in the right-hand winding of coil L34 is increasing. When the current in the right-hand winding of L34 reaches saturation, the resulting voltage reversal on the left-hand winding of coil L34 swings the voltage applied to the base of TR32 from negative to positive with respect to the emitter. As a result, transistor TR32 ceases to conduct between its emitter and collector, and a corresponding voltage rise occurs across the right-hand winding of coil L34. When the voltage in the left-hand winding of coil L34 decays sufficiently, transistor TR32 again becomes conductive between its emitter and collector, so that the tone ringer oscillator including transistor TR32 continues to oscillate in this manner so long as ringing current is received from the line and capacitor C31 is negatively charged in the above-described manner.

The load including transducer RG31 is coupled across the output of the oscillator at the right-hand winding of coil L34 in the manner next set forth. The fixed arm of potentiometer R313 is coupled across the right-hand winding of coil L34. Transducer RG31 is coupled between the variable tap and one side of the fixed arm of potentiometer R313, while a dummy load including serially connected inductance L35 and resistor R314 is bridged across the other side of the fixed arm and the variable tap of potentiometer R313. With this arrangement, the voltage output of the tone ringer oscillator applied to transducer RG31 may be varied from full output to zero volts in order to regulate the sound level produced at transducer RG31. The presence of the dummy load in the oscillator output circuit in the above-described configuration tends to present a constant load to the oscillator output as the position of the variable tap is moved on potentiometer R313, so that the tone shift in the oscillator is kept at a minimum when the volume level of the tone ringer is adjusted.

*Answering an incoming call.*—The user of the subset answers a call by removing the instrument from its cradle, so that the hookswitch mechanism is changed from normal to operated condition as previously noted. Among the first effects of the operation of the hookswitch mechanism is to make the above-described tone ringer inoperative by: (1) disconnecting the −6 volt source from the collectors of transistors TR31 and TR32 at the break portions of contact set HS32; and (2) opening the above-described tone ringer input circuit at break contacts HS31. For this reason, transducer RG31 is no longer energized, even though ringing voltage signals may be induced in the right-hand winding of transformer L31 for a time interval following the removal of the handset from its cradle.

Transistor TR33 functions as a switch and is effective in combination with particular hookswitch contact sets for connecting the −6 volt source to various power consuming devices within the subset, such as oscillators A and B, the amplifier-receiver, the acknowledgment detector, the microphone preamplifier, and the transmitting amplifier. When the hookswitch mechanism is in normal condition, the base of transistor TR33 is maintained at +1.5 volts supplied through resistor R315, so that the base of transistor TR33 is positive with respect to its emitter. Accordingly, the emitter-collector impedance of transistor TR35 is of the high order, so that the −6 volt source, connected to collector of transistor TR33, is effectively disconnected from the power consuming devices. The hookswitch mechanism in operated condition is effective for making the switch including transistor TR33 conductive by connecting the base of transistor TR33 to the −6 volt source at the make portions of contact set HS32, with the effect that its emitter-collector impedance becomes small and conducor CD311 is effectively connected to the emitter and the −6 volt source. Conductor CD311 is connected in the manner set forth in the following paragraphs to the power consuming devices within the subset. Closing the make portions of the contact set HS32 is also effective for making delay means including capacitor C33 operative by charging grounded capacitor C33 to substantially −6 volts through resistor R316. The purpose in the operation of the delay means is to be explained in connection with the hang-up operation of the instrument.

The hookswitch mechanism in operated condition is effective for making operative the transmitting amplifier comprising transistors TR34 and TR35. Accordingly, the application of −6 volts to conductor CD311 in the above-described manner is effective for applying −6 volts to the collectors of transistors TR34 and TR35 through the right-hand winding of transformer L32 and resistor R321, respectively. Further the operation of contact set HS33 of the hookswitch mechanism transfers the bases of transistors TR34 and TR35 from their normal, ground potential (applied through resistors R318—319 and R323, respectively) to +1.5 volts at the break and make portions, respectively, of the contact set. At this time, the bases of transistors TR34 and TR35 are made negative with respect to their emitters by first and second voltage dropping circuits including resistors R317—R320 and R322—R325, respectively, the first and second voltage dropping circuits being connected from the +1.5 volt source through contact set HS33 to the collectors of transistors TR34 and TR35, respectively. The transmitting amplifier is of the well known resistance-coupled type, having first and second stages comprising transistors TR34 and TR35, respectively. The transmitting amplifier in operative condition is effective for amplifying signals applied to its input, i.e., between the base and emitter of transistor TR35, and for causing the amplified signals to be applied through the right-hand winding of coupling transformer L32 to the transmit channel of line 211. In this manner, signals generated at the station are amplified and sent over the line transmit channel to central office 130.

The power switch in operated condition is further effective in response to the operation of the hookswitch mechanism for making the amplifier-receiver and acknowledgment detector operative by extending the −6 volt energizing potential from conductor CD311 to conductor CD411 at the make portions of contact set HS43 and, therefore, to the power input of the amplifier-receiver and acknowledgment detector. The operation of these devices is further explained in the following paragraphs.

The removal of the handset from the cradle or receiving means and the resulting operation of the power switch is effective in combination with the operation of the hookswitch mechanism for connecting the −6 volt source to the power input of the acknowledgment detector flip-flop comprising transistors TR45 and TR46 in order to allow the flip-flop to be changed from its normal condition to either of its first or second stable, operated states. The operation of the hookswitch mechanism is further effective for insuring that the flip-flop is placed in the first of the two stable states, i.e., where transistor TR45 is conductive between its emitter and collector, while transistor TR46 is not so conductive.

Accordingly, the application of −6 volts to conductor CD411 through the power switch in the above-described manner is effective for applying −6 volts to the left-hand side, i.e., to a first point, of the acknowledgment detector flip-flop including serially connected resistors R432, R433, and R434. This is effective for making the base of transistor TR45 negative with respect to its emitter. As previously explained, make contact set HS45 becomes operated after contact set HS43, so that make contact set HS45 applies the −6 volts present on conductor CD411 to the right-hand side, i.e., to a second point, of the flip-flop including serially connected resistors R436, R437, and R439 after transistor TR45 has been prepared for operation. When the −6 volts has been applied to the right-hand side of the flip-flop, current conducted between the emitter and collector of transistor TR45 creates a voltage drop across resistors R437 and R439 which makes the base of transistor TR46 positive with respect to its emitter. For this reason, transistor TR46 is not conductive between its emitter and base at this time.

The acknowledgment detector flip-flop functions as a switch for controlling means including oscillators A and B for generating supervisory and directive signals at the station. To this end, the flip-flop in its first stable state is effective for applying voltage to the power input of oscillator B in order to cause the latter to generate a seize signal to be applied to the transmitting amplifier, and therefore to the transmit channel of line 211. During the time that transistor TR45 has maintained it conductive between its emitter and collector, the junction between resistors R432 and R433 as well as conductor CD412 are maintained at approximately −3 volts. Gating diode RCT42 becomes conductive when the −3 volts is applied to its negative plate by conductor CD412, so that voltage is now applied to the oscillator B input. At this time, oscillator A is not energized because the gating diode RCT41 is oppositely poled with respect to the negative voltage present on conductor CD412.

Oscillator B may be any one of a number of well known types, and includes transistor TR48 and a tank circuit comprising inductance L44 and parallel connected capacitor C432. Trimmer capacitors C433, C434, C435, and C436 are provided in the oscillator tuner. The trimmer capacitors are of different values and are to be connected in parallel with tank capacitor C432 in a manner to be described. Inductance L43 is coupled to inductance L44 for providing feedback.

The negative voltage present on conductor CD412 is passed through diode RCT42 to the power input of oscillator B and hence to the voltage dropping resistors R448 and R449 and the upper end of the oscillator tank. The application of voltage to the dropping resistors is effective to swing the base and collector of transistor TR48 negative with respect to its emitter, so that the signal generating means including oscillator B is selectively operated at this time. The details of the operation of the oscillator are not given here because they are well known to those skilled in the art and because my invention is not concerned with such details; however, the tuning of oscillator B carried out in order to achieve selective operation of the oscillator is next described.

Oscillator B is automatically energized in the above-described manner upon the removal of the instrument from its cradle. In order to fulfill its function, oscillator B must be tuned to generate a signal of a particular frequency, so that the equipment at central office 130 may recognize the seize signal as such. Accordingly, the hookswitch mechanism including make contact set HS46 is effective in response to the unoperated condition of the manually controlled means including break contact set TS46 for tuning oscillator B to transmit a signal, as 1500 cycles per second, for example, to the transmitting amplifier by connecting trimming capacitor C436 in parallel with tank capacitor C432. The circuit is traced from the upper end of capacitor C432 through capacitor C436, break contact set TS46 of the manual tuner control keys, the make portion of hookswitch mechanism contact set HS46 to the lower end of capacitor C432. The 1500 cycle signal on conductor CD413 is applied through resistor R447 and capacitor C425 to the transmitting amplifier input, where the signal is amplified and applied to the line transmit channel in the previously described manner.

*Receiving an acknowledgment signal.*—The 1500 cycle signal from the station oscillator B received at multifrequency receiver MFR132 within central office 130 is effective for causing means (not shown) at the central office to interrupt the operation of voice frequency transmitter 131, which up to the point has been transmitting the 400 cycle ringing voltage to the subscriber station. The same means is also effective for causing transmitter VFT131 to send a single burst of 600 cycle per second acknowledgment signal to the station.

Within the station, means comprising the acknowledgment detector including transistors TR43 and TR49 is effective for detecting the presence of the 600 cycle acknowledgment signal on the receive channel. The detecting means is normally (i.e., when the handset is in place on the cradle) decoupled from the receive channel of line 211. The hookswitch mechanism, operated to its second condition, is effective for coupling the detecting means to the line and for otherwise making the detecting means operative. The acknowledgment detector is thereafter effective in response to the receipt of an acknowledgment tone for causing the acknowledgment detector flip-flip to change over from its first to second stable state in order to shut off the signal transmitting means including oscillator B. These functions are next taken up in detail.

The hookswitch mechanism in operated condition is effective at make contact set HS43 for making the acknowledgment detector operative by connecting the −6 volt source to conductor CD411 as previously described, and therefore to the collectors of transistors TR43 and TR49 over an obvious circuit and by connecting the +1.5 volt source to a circuit for biasing the base of transistors TR43 negative with respect to its emitter. The biasing circuit is traced from the +1.5 volt source through the middle winding of transformer L31 and resistors R423 and R427 to conductors CD411, which is now maintained at −6 volts. Under these conditions, transistor TR43 is normally conductive in its emitter-collector circuit. The voltage induced in the middle winding of transformer L31 by the acknowledgment signal is superimposed on the biasing voltage applied across the emitter base of transistor TR43.

During the time the base of transistor TR43 is driven positive with respect to its emitter by the positive halves of the 600 cycle acknowledgment tone voltage, current stops flowing between the emitter and collector of transistor TR43. The resulting voltage impulses between emitter and collector of transistor TR43 are applied to capacitor C414 and passed through coupling means including capacitor C416 and resistor R426 to the input of the second stage of the acknowledgment detector comprising parallel-connected capacitors C415 and resistor R425 which in turn are bridged between the +1.5 volt source and the base of transistor TR49. The filtering action of the interstage coupling network including diode RCT43, resistors R426 and R425, and capacitors C414, C415 and C416 is effective for discriminating against unwanted high and low frequency signals applied to the acknowledgment detector input from the line, so that the likelihood of operation of the acknowledgment detector caused by noise voltages is reduced. Further, the values of resistors R425 and R426 and capacitor C415 are chosen to delay making transistor TR49 conductive between its emitter and collector for a predetermined time interval after transistor TR43 first becomes conductive between its emitter and collector. This time delay further reduces the likelihood that the acknowledgment detector will be operated by noise signals from the receive channel.

During the time that the signal is applied to the input of the second stage, the base of transistor TR49 becomes negative with respect to its emitter, so that transistor TR49 becomes conductive between its emitter and collector. As a result, the −6 volt source connected to the collector of transistor TR49 is applied through the emitter and therefore to the base of transistor TR46 within the right-hand side of the acknowledgment detector flip-flop.

The application of the negative voltage to the base of transistor TR46 is effective for causing the acknowledgment detector flip-flop to change over to its second stable state, i.e., where transistor TR45 ceases to conduct and transistor TR46 becomes conductive between its emitter and collector. The transfer of the flip-flop from its first to second state is brought about by making the base of transistor TR46 negative with respect to its emitter in the above-described manner, whereupon transistor TR46 becomes conductive between its emitter and collector. As a result, the voltage at the point between resistors R432 and R433 changes from the previously described −3.3 volts to approximately +.5 volts. Under these conditions, the base of transistor TR45 is positive with respect to its emitter and transistor TR45 ceases to conduct. At this point the voltage at the intersection of resistors R436 and R437 becomes approximately −3.3 volts. The flip-flop stays in its second state upon the removal of the acknowledgment tone signal from the line receive channel and the resulting return of transistor TR49 to its normal, nonconductive state, and so long as voltage continues to be applied to the flip-flop by the previously described means including the hookswitch contact mechanism set HS43 and HS45.

Transferring the flip-flop to its second state in the above-described manner is effective for automatically shutting off oscillator B by changing the voltage applied to the gating means including diode RCT42 and the power input of oscillator B from negative to positive. This reversal of polarity makes diode RCT42 nonconductive. Oscillator B thereupon stops transmitting the 1500 cycle tone to the transmitting amplifier, and therefore to the line transmit channel.

It is to be realized that the start of the transmission of the 1500 cycle tone from oscillator B, the resulting actuation of voice frequency transmitter VFT131, and the ultimate shut-down of oscillator B all take place within a short time interval. In practice it has been found that this sequence of events may be made to take place in substantially less time than is required for the user of the subset to remove the instrument from its cradle and to apply the receiver bearing portion to his ear.

*Transmitting speech signals from the station.*—After acknowledgment tone has been received at the station and oscillator B made non-operative, speech signals may be transmitted to and received from line 211. Transmitter TRM41 is of the type that does not require any external power other than the speech input to generate signals. The output of transmitter TRM41 is coupled to the input of a preamplifier including transistor TR47 by means including capacitors C428 and C429.

The preamplifier is made operative upon the operation of the hookswitch mechanism and resulting application of −6 volts to conductor CD411, which takes place in the previously described manner. The −6 volts applied on conductor CD411 is applied to the collector of transistor TR47 through resistor R443, while the emitter of transistor TR47 is connected to the +1.5 volt source through resistor R444. The base of transistor TR47 is maintained negative with respect to its emitter by virtue of its connection to the junction between the voltage dropping resistors R445 and R446, which in turn are connected across the collector of transistor TR47 and the +1.5 volt source. The speech input signals from transmitter TRM41 applied between base and emitter of transistor TR47 are amplified and applied through coupling capacitors C426 to the input of the transmitting amplifier.

Speech signals from the preamplifier are further amplified within the transmitting amplifier in the same manner as described in connection with the operation of oscillator B during the transmission of a seize signal from the station. Similarly, speech signals from the transmitting amplifier are coupled to the transmit channel of line 211 by transformer L32.

*Receiving signals from the line.*—Speech signals incoming from the line receive channel and induced in the middle winding of transformer L31 are coupled by means including hookswitch contacts HS41 to the input of the amplifier-receiver, i.e., across the series-connected potentiometer R412 and resistor R413. The amplifier includes transistors TR41 and TR42 and receiver RCV41 arranged in the well known resistance-coupled configuration, so that when the amplifier is operative, its output is applied to and thereby drives receiver RCV41. The amplifier including transistors TR41 and TR42 is made operative in an obvious manner when the −6 volts is applied to conductor CD411 as set forth in the preceding paragraphs.

Potentiometer R412 may be manually adjusted for the purpose of regulating the level of speech signals applied to the amplifier input in order to regulate the level of speech signals applied to receiver RCV41.

*Side tone insertion.*—In order to inform the person using the station that the various signal generating means including oscillators A and B and transmitter TRM41 are producing a signal to the transmit channel, means is provided for inserting a part of the output signal to the signal receiving means including RCV41. This may be accomplished by either of two ways, both of which are described in the succeeding paragraphs.

Referring to FIGS. 3–5, the feedback or "side tone" is achieved by coupling the third, upper winding of transformer L32 across the second stage input of the amplifier-receiver through resistor R418. Output signals induced in the upper winding of transformer L32 are amplified by transistor TR42 and therefore applied to RCV41 in an obvious manner.

Figure 6:
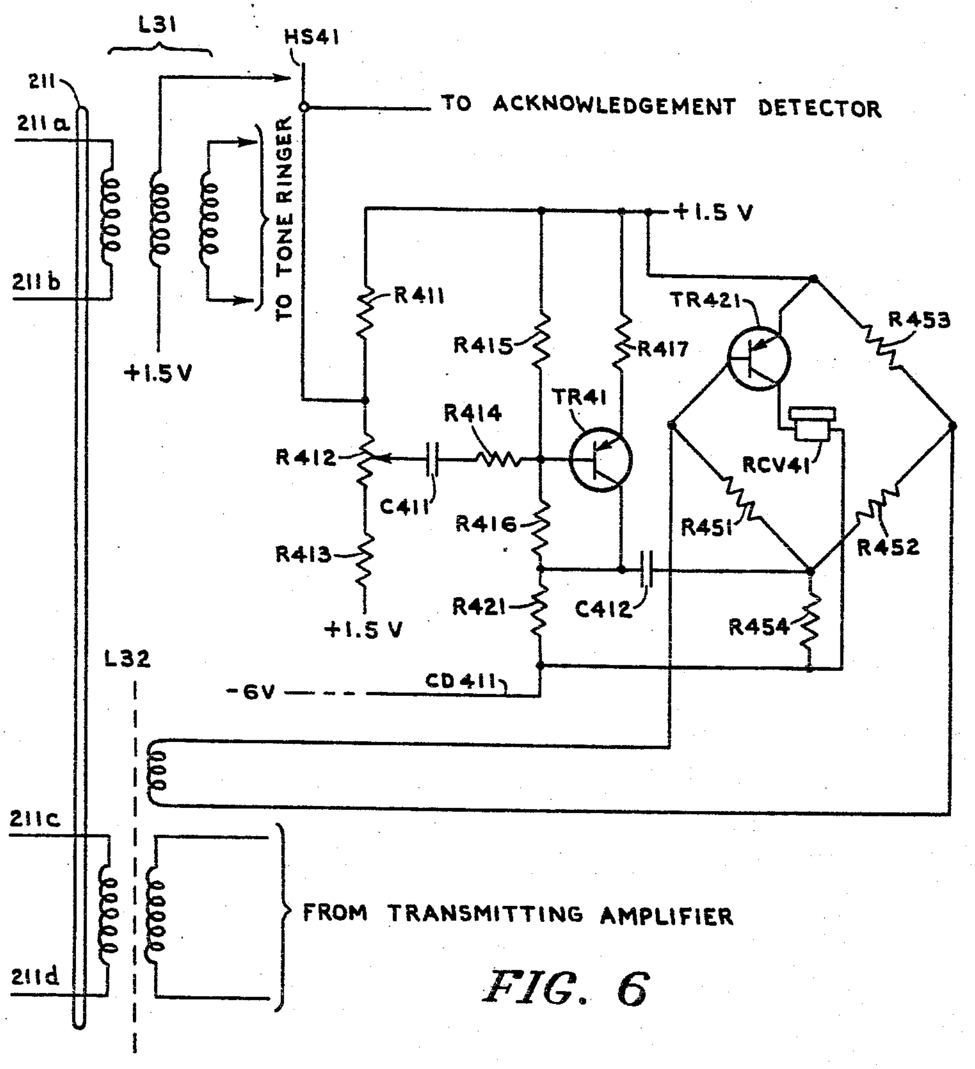
FIG. 6 shows a skeletonized variation of the station telephone and the receiver-amplifier.

A second, more sophisticated approach to the problem of feeding back a side tone signal to receiver RCV41 is set forth in FIG. 6. The apparatus shown in FIG. 6 is identical in function and its relationship to other station equipment to apparatus bearing the same number shown in FIGS. 3–5, except as noted. In contrast to the amplifier-receiver used in the substation shown in FIGS. 3–5, the amplifier-receiver suited for the second method of feeding back side tone to receiver RCV41 includes a first stage including transistor TR41 which is coupled by means comprising capacitor C412 to a bridge circuit including three fixed arms comprising resistors R451, R452, and R453, respectively. The fourth arm in the bridge includes amplifying means comprising transistor TR421. The emitter of transistor TR421 is connected to the +1.5 volt source, while its base is connected to arm resistor R451. Receiver RCV41 is bridge between the collector of transistor TR421 and the −6 volts present on conductor CD411. In the arrangement shown in FIG. 6, when the amplifier-receiver is made operative upon the operation of the hookswitch mechanism in the above-described manner, transistor TR421 is forward biased because the base of transistor TR421 is maintained negative with respect to its emitter owing to the fact that the base is connected to the −6 volt source through resistors R451 and R454, while the emitter is coupled directly to the +1.5 volt source. Arms R451 and R452 are substantially equal, while arm R453 is matched to the base-emitter impedance of transistor R421 at the particular level of conduction of that transistor in the bridge.

With the above-described arrangement, signals applied across the first arm of the bridge from the first stage of the receiver-amplifier are applied through the resistor R451 across the base and emitter of transistor TR421, so that the signals are amplified between the emitter and collector of transistor TR421. Such amplified signals are applied to receiver RCV41. Similarly, signals applied across the opposite diagonal of the bridge from the upper winding of transformer L32 are applied across the base and emitter of transistor TR421 through resistor R453, and are amplified between the emitter and collector of transistor TR421 and applied to receiver RCV41.

Because the above-described bridge is substantially in balance, the first diagonal is coupled to the network including the bridge at points of equal potential with respect to signals applied across the second diagonal, and vice versa. For this reason, the bridge constitutes a unidirectional coupling means such that signals applied to receiver RCV41 are not detectable across the other diagonal of the bridge and signals from the receiver-amplifier are not applied to the transmit channel through the upper, side tone winding of transformer L32.

ORIGINATING A CALL

Assuming that the station shown in FIGS. 3–5 and line 211 are in idle condition, a call may be originated at the station when the user of the subset removes the instrument from its cradle. The user waits until he hears a 600 cycle per second dial tone signal in receiver RCV41 and until that tone has been removed. The user thereafter operates (depresses) appropriate ones of the oscillator tuner keys. Oscillators A and B are thereby selectively operated to send corresponding directive signals to central office 130. Within central office 130, the directive signals are utilized for operating the switching equipment. The operation of the station apparatus used to accomplish these functions is next described.

*Transmission of a seizure signal.*—Upon the removal of the handset from its cradle, the hookswitch mechanism operates to turn on the power switch and to make the various power consuming components within the subset operable. The acknowledgment detector flip-flop is placed in its first stable state, so that transistor TR45 is conductive between its emitter and collector. The signaling means including oscillator B is thereby selectively operated to generate a 1500 cycle seizure signal which is applied to the transmitting amplifier input. The transmitting amplifier applies the amplified signal to the transmit channel of line 211. The operation of the hookswitch mechanism, acknowledgment detector flip-flop, oscillator B and the transmitting amplifier has been described in detail in connection with incoming calls. For this reason, it is not considered to be necessary to repeat the detailed explanation of the operation here.

Within office 130, the 1500 cycle signaling frequency received at multifrequency receiver MFR132 is effective for causing call-originating switching equipment such as a selector (not shown) to be connected to line 211. Subsequent to the connection of the selector to line 211, means within the selector causes voice frequency transmitter VFT131 to send a 600 cycle (dial tone) signal over the receive channel of line 211 to the station. The signal induced in the middle winding of transformer L31 is coupled to the input of the acknowledgment detector. The acknowledgment detector is effective in response to the application of the dial tone signal to its input for causing the acknowledgment detector flip-flop to assume its second stable condition (where transistor TR46 is made conductive between its emitter and collector and transistor TR45 becomes nonconductive). In this condition, the acknowledgment detector flip-flop is effective to turn off oscillator B in order to stop the transmission of the seize signal from the station. The flip-flop remains in its second condition throughout the duration of the call even though the dial tone signal is subsequently removed from the receive channel of line 211.

The 600 cycle dial tone signal induced in the middle winding of transformer L31 is also applied to the receiver-amplifier input. The receiver-amplifier steps up the signal so that receiver RCV41 produces an audible dial tone signal for the user. As before, a detailed description of these elements has been made in connection with an incoming call, so that repetition of the description here is considered to be unnecessary. Unlike the operations set forth in the preceding paragraphs, voice frequency transmitter VFT131 continues to send the 600 cycle dial tone signal to the station until directive signals have been transmitted from the station to the central office 130 in the manner next set forth.

*Manual selective operation of oscillators A and B.*—Thus far the description of the station's directive and supervisory signal generating means has been confined to oscillator B. However, as previously mentioned, the generating means also includes oscillator A, a substantial duplicate of the previously described oscillator B. Oscillators A and B are arranged to be operated under manual control at the same time, each at a different frequency. The outputs of oscillators A and B are combined and applied to the input of the transmitting amplifier, where the compound signal is amplified and applied to the line transmit channel.

In order to manually control oscillators A and B, a plurality of elements comprising manually operable keys K41–K44 and corresponding first and second pluralities of contact sets are provided for selectively tuning each oscillator. A common element comprising other sets of contacts operative in response to the operation of any one of the keys is provided for applying power to the inputs of the oscillators. Because the mechanical arrangement of the sets of keys and contacts is not a part of the present invention, their operation is described in the following paragraphs in general terms only.

Each of the aforementioned keys K41–K44 is capable of operating a corresponding one of the first and second plurality of contact sets. For instance, operating key K43 makes contact sets TS431 in the A and B tuners, respectively, close. Keys K43–K44 are used to cause oscillators A and B to transmit directive signals. Keys K41 and K42 and corresponding contact sets TS41—TS411 and TS42—TS421 shown in FIG. 4 are used to cause oscillators A and B to transmit supervisory signals, rather than directive (digital information) signals to the central office. For instance, key K41 is operated when the user of the station wishes to transmit a recall signal to central office 130. Operation of key K41 causes the signal transmitting means including oscillators A and B to transmit a signal compounded from 900 and 1300 cycle per second signals. The manner in which this control is achieved is substantially the same as the one next described in connection with transmission of directive signals.

Certain ones of the aforementioned oscillator-control contacts sets are effective for connecting particular ones of trimmer capacitors C419–C423 and C433–C436 in parallel with tank capacitors C418 and C432, respectively, over obvious circuits in order to tune oscillators A and B to predetermined particular frequencies. In addition to operating its corresponding contact sets within each of oscillators A and B, each of keys K41–K44 is effective for operating the aforementioned common contact sets including double make contact sets TS45 and break contacts TS46. Contact set TS45 operated in response to the manual operation of any one of the keys K41–K44 is effective for applying power to the input of oscillator A by extending a connection from conductor CD411 to the power inputs of oscillator A through contact set TS45 and resistor R441; the same connection is further extended through gating diode RCT41 to the power input of oscillator B. It is pointed out that the presence of diode RCT42 prevents negative voltage applied through contact set TS45 to the input of oscillator B from being applied to conductor CD412 and the acknowledgment detector flip-flop. The acknowledgment detector flip-flop therefore remains undisturbed at this time.

Assuming that key K43 has been operated, the operation of key K43 is effective for closing make contact sets TS43 and TS431. Within oscillator A, the operation of contact set TS43 is effective for connecting capacitor C421 in parallel with tank capacitor C418. The value of capacitor C421 is chosen to make oscillator A produce an 1100 cycle per second signal. Within oscillator B, the closing of make contact set TS431 is effective for connecting capacitor C435 in parallel with capacitor C432. The value of capacitor C435 is chosen to make oscillator B produce a 1300 cycle per second signal.

The outputs of oscillators A and B are coupled through means comprising individual resistors R442 and R447, respectively, and common blocking capacitor C425 to the input of the transmitting amplifier. As previously described, the transmitting amplifier couples amplified signals to the transmit channel of line 211.

Returning to the consideration of the contact sets common to the individual tuner contact sets, contact sets TS45 in operated condition is also effective for suppressing the operation of transmitter TRM41 during the time that one of keys K41–K44 is depressed. This is achieved by shorting out transmitter TRM41. The upper side of transmitter TRM41 is coupled to the +1.5 volt source through capacitor C428, so that the connection of —6 volts to the lower side of transmitter TRM41 through the middle spring of the double make contact set TS45 effectively shorts out transmitter TRM41 during the time that the A and B oscillators are operative under the control of the manually operable keys. By this means, transmitter TRM41 is prevented from sending spurious signals to the transmit channel during the time that oscillators A and B are directively operated.

Means including the set of common contacts is also effective in response to the operation of one of the sets of tuning keys and to the operation of the hookswitch mechanism for making oscillator B tunable to any of the signal frequencies, rather than at the frequency required to send a seize signal. This is accomplished by disconnecting trimmer capacitor C436 from its previously described connection to tank capacitor C432 at break contacts TS46.

When the operated one of the tuner keys is released, oscillators A and B are made inoperative by the removal of the —6 volts from the power input of the oscillators at make contacts TS45. Trimmer capacitors corresponding to the selected one of the tuning keys is removed from its parallel connection to the tank capacitor in each of oscillators A and B, so that each oscillator is again in normal condition. Thus it is seen that oscillators A and B produce signals on the basis of particular combinations of trimmer capacitors in parallel with tank capacitors C418 and C432, respectively, only during the time that any of the manually controlled tuning keys is operated.

From the above paragraphs it is seen that the operation of any one of the manually operable keys is effective to operate the signal generating means including oscillators A and B in any one of a corresponding plurality of distinctive manners. As many directive signals as required may be transmitted to central office 130 in this manner. As a consequence, the switching apparatus at central office 130 is directively operated, and a connection from the calling line 211 is established to the required, called line. Speech signals may thereafter be sent from and received at the station shown in FIGS. 3–5 over the transmit and receive channels of line 211 in the previously described manner. The call continues to its conclusion.

HANG-UP OPERATION

A call to or from the station shown in FIGS. 3–5 is concluded with the return of the instrument to its cradle. Upon the return of the hookswitch contact mechanism to normal condition, the receive channel of the line is disconnected from both the amplifier-receiver and the acknowledgment detector at make contacts HS41. The hookswitch mechanism in normal condition is also effective for returning the transmitting amplifier to its normal, standby condition by transferring the emitters of transistors TR34 and TR35 from their connection to the +1.5 volt source to ground at the make and break portions, respectively, of transfer contacts HS33.

The return of the hookswitch mechanism to normal condition is effective for removing the actuating voltage from the power switch means comprising transistor TR33 by disconnecting the —6 volt source from the transistor base at the make portions of contact set HS32. However, transistor TR33 remains conductive between its emitter and collector, because its base is maintained negative with respect to its emitter by means comprising capacitor C33, which has been charged in the previously described manner. After the make portion of contact set HS32 is opened, grounded capacitor C33 discharges through the +1.5 volt source connected to the upper end of capacitor C33 through resistors R315 and 316. When the voltage on capacitor C33 has been reduced to the point where the base of transistor TR33 is positive with respect to its emitter, the transistor ceases to conduct between its emitter and collector, and the power switch is returned to its non-operated condition. The time delay introduced in the return of the power switch to its normal condition and the resulting effective opening of the connection between the —6 volt source and conductor CD311 is determined by the decay rate of the charge on capacitor C33.

During the period that the hookswitch mechanism is being returned to normal condition, transmitter TRM41 is shorted out in order to prevent signals generated at the transmitter from interfering with the transmission of the disconnect signal from oscillators A and B (to be described below). To this end, break contact set HS44 closes before the make portions of contacts HS43 open, so that during the period when power continues to be supplied to the preamplifier through conductor CD411 and resistor R443, transmitter TRM41 connected across the —6 volt source and the 1.5 volt source at break contacts HS44, is effectively shorted out.

The return of the hookswitch mechanism to normal condition is further effective for preparing oscillators A and B for generating a disconnect signal. In the case of oscillator B, this is done by disconnecting trimmer capacitor C436 from its previously described connection in parallel with tank capacitor C432 and for connecting trimmer capacitor C435 in its place at the make and break portions, respectively, of contact set HS46. In the case of oscillator A, preparation is completed by trimmer capacitor C420 in parallel with tank capacitor C418 at break contact set HS42. Thus, oscillators A and B are effective in response to the return of the hookswitch mechanism to normal condition for transmitting 900 and 1300 cycle per second signals, respectively, during the time the —6 volt source is connected to the power inputs of the oscillators in the manner to be described next.

The hookswitch mechanism in normal condition is effective in response to the operation of the power switch in its conductive condition for connecting the —6 volt source to the power inputs of oscillators A and B by way of conductor CD311 and resistor R440 at the break portions of contact set HS43. During the time that the power switch including transistor TR33 is maintained operative and conductor CD311 is maintained at —6 volts, oscillators A and B transmit the disconnect signal to the input of the transmitting amplifier. As in the case of transmission of directive signals from oscillators A and B, the transmitting amplifier is maintained operative after the hookswitch is returned to its normal condition for a predetermined time interval by virtue of the connection of the base of transistors TR34 and TR35 to conductor CD311. Upon the effective disconnection of the —6 volt source from conductor CD311 when the power switch is restored to its normal condition, the power consuming devices at the station are shut off or returned to standby condition. The station is in normal condition, and ready for further service.

While we have shown and described the preferred embodiment of our invention with particularity, changes and modifications of our disclosure will be obvious to those skilled in the art. We therefore aim in the claims appended to and forming a part of the present specification to cover all such changes and modifications as fall within the true spirit and scope of our invention.

What is claimed is:

1. In a system having a line, a station for transmitting signals to and from said line, and other means remote from said station for transmitting signals to and from said line; the combination in said station comprising: means coupled to said line for transmitting signals to said line, a handset, means for rendering said handset operative in response to the removal of said handset therefrom for operating said signal transmitting means to generate a seize signal on said line, means at said other means remote from said station for transmitting an acknowledgment signal on said line upon receipt of said seize signal and detecting means coupled to said line operative in response to the receipt of said acknowledgment signal from said line for stopping the operation of said signal transmitting means, whereby a seize signal is transmitted from said station to said line upon the removal of said handset from said receiving means until an acknowledgment signal from said line is received at said station.

2. The combination set forth in claim 1 wherein said detecting means is normally inoperative and said handset receiving means is also operative in response to the removal of said handset therefrom for making said detecting means operative.

3. In a system having a station, a line having first and second channels for conveying signals to and from respectively said station, and other means remote from said station for sending and receiving signals over said first and second channels, respectively; the combination in said station comprising: means coupled to said second channel for transmitting signals to said line, a handset, means responsive to the removal of said handset therefrom for operating said signal transmitting means to generate a seize signal on said second channel, means at said other means remote from said station for generating an acknowledgment signal on said first channel upon receipt of said seize signal, and means at said station coupled to said first channel for deactivating said signal transmitting means upon the receipt of said acknowledgment signal.

4. The combination set forth in claim 3 wherein said detecting means is normally inoperative and said handset receiving means is also operative in response to the removal of said handset therefrom for making said detecting means operative.

5. In a system having a line, a station for transmitting signals to and from said line, and other means remote from said station for transmitting signals to and from said line; the combination in said station comprising: means coupled to said line for transmitting signals to said line, said transmitting means having a power input circuit and being operative in response to the application of power thereto, a power source, switching means having a normal condition and operative to first and second stable conditions, said switching means in first and second conditions being effective for connecting and disconnecting respectively said power source from the power input circuit of said transmitting means, a handset, means including a hookswitch mechanism for receiving said handset, said hookswitch mechanism being operative to first and second conditions in response to the placement of said handset on and the removal of said handset from said receiving means, respectively, means including said hookswitch mechanism in second condition being effective for placing said switching means in first condition in order to cause said transmitting means to send a seize signal to said line, means at said other means remote from said station for transmitting an acknowledgment signal on said line in response to the receipt of said seize signal, detecting means operative in response to the receipt of said acknowledgment signal from said line for operating said switching means from said first to said second condition in order to cause said transmitting means to cease sending the seize signal to said line, and coupling means for coupling said detecting means to said line.

6. The combination set forth in claim 5 wherein said detecting means is operative in response to the receipt of a signal of predetermined minimum time duration in order to minimize the possibility of operation of said detecting by extraneous signals received from said line.

7. The combination set forth in claim 5 wherein said detecting means is responsive to an alternating current signal, and said coupling means includes a band pass filter in order to minimize the possibility of operation of said detecting means by extraneous signals received from said line.

8. The combination set forth in claim 5 wherein said switching means comprises a flip-flop having a power input, said flip-flop being operative from a normal condition to either of first or second stable states in response to the application of power to said input, said hookswitch mechanism operated from first to second condition is effective for connecting said source to said input and for placing said flip-flop in its first stable state, said flip-flop thereafter being operative to its second stable state in response to the operation of said detecting means and to its normal state in response to the removal of power from said flip-flop input, said flip-flop in first stable state being effective for connecting said source to said transmitting means input and effective in normal and second stable state for connecting and disconnecting said source from said transmitting means input.

9. In a telephone system, a substation coupled to a central station by a line, a hookswitch at said substati.n, means at said substation for generating a fluctuating seize signal on said line when said hookswitch assumes an offhook condition, means at said central station for transmitting an acknowledgment signal to said substation upon receipt of said seize signal, means at said substation for deactivating said means for generating a fluctuating seize signal upon the receipt of said acknowledgment signal, and means at said substation for transmitting a fluctuating disconnect signal to said central station when said hookswitch assumes an onhook condition.

10. A substation coupled to a line communicating with a central office, said substation comprising, a hookswitch, a signal generator having an output circuit coupled to said line and having a first and second activating circuit, a power supply, a signal generator control switch having an input circuit and a first and second output circuit, a power switch for coupling said power supply to the input circuit of said signal generator control switch when said hookswitch is in an offhook condition, means for coupling the first activating circuit of said signal generator to the first output circuit of said signal generator control switch, means for coupling the second output circuit of said signal generator control switch to the second activating circuit of said signal generator for a short interval after said hookswitch assumes an offhook condition to cause a seize signal to be impressed upon the line, means for coupling the input circuit of said signal generator control switch to the second output circuit of said signal generator control switch when said hookswitch is in an offhook condition and for coupling the input circuit of said signal generator control switch to the first output circuit of said signal generator control switch when said hookswitch is in an onhook condition and means for delaying the opening of said power switch for a short interval after said hookswitch reverts to the onhook condition, thereby to cause said signal generator to be activated by energization of the first activating circuit of said signal generator to cause a singal to be impressed on the line upon reversion of said hookswitch to said onhook condition.

11. In a telephone subset, a hybrid impedance bridge circuit comprising a first, second, third and fourth arm, means for coupling said first arm to said second arm at a first junction point, means for coupling said second arm to said third arm at a second junction point, means for coupling said third arm to said fourth arm at a third junction point, means for coupling said fourth arm to said first arm at a fourth junction point, a first transmission channel for receiving signals from a distant station, means for coupling said first transmission channel to said first and third junction points, a second outgoing channel, a signal transmitter, means for coupling said signal transmitter to said second outgoing transmission channel, means for coupling said second outgoing transmission channel to said second and fourth junction points, a control device having an output circuit and a control circuit, means for connecting said control device in one of said arms, an electrical transducer for converting electrical energy into sound energy, and means for coupling said electrical transducer to the output circuit of said control device.

12. The combination set forth in claim 11 wherein a hookswitch is provided together with means responsive to a change of state of said hookswitch for biasing said control device to a non-conductive state.

References Cited in the file of this patent

UNITED STATES PATENTS

| | | |
|---|---|---|
| 2,484,234 | McKim | Oct. 11, 1949 |
| 2,511,616 | Barstow | June 13, 1950 |
| 2,511,948 | Wang | June 20, 1950 |
| 2,599,097 | Entz | June 3, 1952 |
| 2,610,256 | Brandt | Sept. 9, 1952 |
| 2,641,692 | Lewis | June 9, 1953 |
| 2,657,266 | Hoth | Oct. 27, 1953 |
| 2,721,897 | Schneckloth | Oct. 25, 1955 |
| 2,733,299 | Staples | Jan. 31, 1956 |
| 2,916,558 | Leman | Dec. 8, 1959 |
| 2,938,082 | Mohler et al. | May 24, 1960 |
| 2,950,351 | Leman | Aug. 23, 1960 |